US012595208B2

(12) United States Patent
Miyasaki et al.

(10) Patent No.: US 12,595,208 B2
(45) Date of Patent: Apr. 7, 2026

(54) MASONRY MATERIAL UTILIZING RECYCLED CONSTRUCTION AND DEMOLITION WASTE

(71) Applicant: WASHINGTON STATE UNIVERSITY, Pullman, WA (US)

(72) Inventors: Taiji Miyasaki, Pullman, WA (US); David Drake, Pullman, WA (US)

(73) Assignee: Washington State University, Pullman, WA (US)

( * ) Notice: Subject to any disclaimer, the term of this patent is extended or adjusted under 35 U.S.C. 154(b) by 267 days.

(21) Appl. No.: 18/455,754

(22) Filed: Aug. 25, 2023

(65) Prior Publication Data

US 2024/0010558 A1      Jan. 11, 2024

Related U.S. Application Data

(62) Division of application No. 17/258,594, filed as application No. PCT/US2019/041362 on Jul. 11, 2019, now Pat. No. 11,780,774.

(60) Provisional application No. 62/824,720, filed on Mar. 27, 2019, provisional application No. 62/696,678, filed on Jul. 11, 2018.

(51) Int. Cl.
| | |
|---|---|
| *C04B 18/167* | (2023.01) |
| *B28B 11/04* | (2006.01) |
| *C04B 18/14* | (2006.01) |
| *C04B 18/16* | (2023.01) |
| *C04B 18/24* | (2006.01) |
| *C04B 28/04* | (2006.01) |
| *C04B 28/08* | (2006.01) |
| *C04B 28/14* | (2006.01) |

(Continued)

(52) U.S. Cl.
CPC ............ *C04B 18/167* (2013.01); *B28B 11/04* (2013.01); *C04B 18/142* (2013.01); *C04B 18/16* (2013.01); *C04B 18/243* (2013.01); *C04B 28/04* (2013.01); *C04B 28/082* (2013.01); *C04B 28/142* (2013.01); *C04B 41/009* (2013.01); *C04B 41/61* (2013.01); *C04B 2201/30* (2013.01)

(58) Field of Classification Search
CPC .................................................. C04B 20/026
See application file for complete search history.

(56) References Cited

U.S. PATENT DOCUMENTS

| | | | | |
|---|---|---|---|---|
| 5,238,195 A | * | 8/1993 | Knez, Jr. ................. | B03B 9/065 241/DIG. 38 |
| 8,011,606 B1 | * | 9/2011 | Chrestenson ........... | B07B 13/16 241/101.76 |

(Continued)

*Primary Examiner* — Virak Nguon
(74) *Attorney, Agent, or Firm* — WCF IP

(57) ABSTRACT

The embodiments herein are directed to dry wall waste mixtures, formed under pressure into example embodiments referred to herein as dry wall waste blocks (DWBs) and/or gypsum wallboard waste blocks (GWWBs) and tile structures. DWBs/GWWBs mixtures in particular, often incorporate a higher percentage in the composite mixtures from about 60% up to 85% of dry wall waste than other mixtures and beneficially often incorporates substantially all of the wallboard facing paper as part of the composite mixture. That is, waste processing is simplified by comingling core and paper layers in the final product. DWBs/GWWBs mixtures utilize demolition and construction waste, replacing a high percentage of Portland cement with waste-derived binder.

17 Claims, 6 Drawing Sheets

(51) Int. Cl.
    *C04B 41/00*        (2006.01)
    *C04B 41/61*        (2006.01)

(56)             References Cited

U.S. PATENT DOCUMENTS

2012/0153058 A1*   6/2012   Nishi ..................... B03B 9/065
                                            241/60
2017/0341084 A1*   11/2017   Brouwer ................... B02C 4/32

* cited by examiner

MASONRY MATERIAL UTILIZING RECYCLED CONSTRUCTION AND DEMOLITION WASTE

CROSS-REFERENCE TO RELATED APPLICATION(S)

The present application claims under 35 U.S.C. § 119, the priority benefit of U.S. Provisional Application No. 62/696, 678, filed Jul. 11, 2018, entitled "RECYCLED COMPOSITE MATERIAL USING GYPSUM WALLBOARD AND OTHER WASTE MATERIALS AND RELATED METHODS," and Provisional Application No. 62/824,720, filed Mar. 27, 2019, entitled "A NOVEL MASONRY MATERIAL UTILIZING RECYCLED CONSTRUCTION & DEMOLITION WASTE," both of which are incorporated herein by reference in its entirety.

FIELD OF THE INVENTION

The present invention herein relates to composite mixtures for masonry applications. In particular, the present invention disclosed herein relates to methods for producing masonry materials, such as, tiles and high strength load-bearing or otherwise solid shapes using composite mixtures that include gypsum drywall waste.

BACKGROUND OF THE INVENTION

Waste from building construction and demolition (C&D) is a growing problem. Industry studies show recycling C&D waste provides environmental and economic benefits. However, challenges remain for recycling some C&D waste materials, especially when recycled wastes have limited use and low value.

Gypsum drywall (known as drywall, plasterboard, and the trade name Sheetrock) is widely used for residential and commercial interiors. In 2017, an estimated 2.3 billion m² (25 billion ft²) of drywall was sold in the United States alone. Drywall is fire resistant, inexpensive, and relatively easy to install. Drywall panels substantially are of a gypsum ($CaSO_4 \cdot 2H_2O$) core, sandwiched between paper facing and backing layers, modified with various admixtures. Such drywall panels to be installed in residential and commercial interiors are often mounted onto existing stud structures with conventional fasteners such as nails or drywall screws. Abutting panels often has an uneven seam which is sealed with a filler (i.e., a joint compound) which dries and hardens. The hardened joint compound is often sanded to create a smooth wall surface which completes the drywall process. Joint compounds can be of a setting formulation, i.e., a powder which often requires the addition of water prior to application so as to react chemically for hardening with a given time frame, or a drying formulation, i.e., a compound formulated as a ready-mixed joint compound that dries by contact with air as a result of evaporation of water. Such installation methods minimize joints between panels to reduce finishing costs, but produce significant waste: typically, 10-12% of installed material. Building demolition generates more than three times the volume of drywall waste from construction.

Historically, drywall waste has been disposed of in municipal landfills, comingled with other C&D wastes. In 2016, the most recent year for which figures are available, 8.8 million metric tons (9.7 million short tons) of drywall waste was landfilled in the United States, approximately 9.1% of all landfilled waste from building C&D. Under landfill conditions, Sulphur-reducing bacteria metabolize drywall waste and produce hydrogen sulphide gas ($H_2S$). Trace amounts of $H_2S$ result in offensive 'rotten-egg' odors, and higher concentrations impact human health. To mitigate this, diversion of drywall waste from landfills through expanded recycling has been proposed, and some localities have banned drywall waste from landfills.

There are limited uses for recycled construction drywall waste. Due to inconsistency and concerns over contamination, virtually all drywall waste from demolition is landfilled. Lack of demand for recycled drywall waste is a barrier to increased recycling. Drywall recyclers have unused capacity, and would like new markets, requiring new applications for recycled waste.

Accordingly, there is a need for finding beneficial alternatives for the recovered drywall waste materials/products. The embodiments herein address such a need by providing for recycled drywall waste materials/products via formed under pressure methods. The beneficial aspects of the embodiments disclosed herein include, but is not strictly limited to, waterproof and lighter than earth blocks, bricks, or concrete-like high strength load-bearing solid shaped units (e.g., block (to include hollow core configurations), spherical, cylindrical, etc., shapes often configured for masonry applications). Such masonry units, which are similar to adobe or compress earth blocks but are superior in various aspects (e.g., for insulation), are derived from recycled gypsum drywall waste/products that include(s) as part of the simplification of the process, the outer facing paper that lines both sides of the inner substantially gypsum core material so as to remove the need for expensive paper processing and enable on-site production.

SUMMARY OF THE INVENTION

The embodiments herein are directed to drywall waste mixtures, formed under pressure into example embodiments, such as, drywall waste blocks (DWBs) and/or gypsum wallboard waste blocks (GWWBs). DWBs/GWWBs mixtures often incorporate a higher percentage of drywall waste than other mixtures. Waste processing is simplified by comingling core and paper layers in the final product. DWBs/GWWBs mixtures utilize demolition and construction waste, replacing a high percentage of Portland cement with waste-derived binder.

An example aspect of the invention herein is directed to recycled drywall waste structural composition that includes: a core material, wherein the core material includes: 60 percent up to about 85 percent by total dry weight of demolition waste; wherein the demolition waste further comprises 2 percent (%) up to 15 percent (%) by dry weight of recycled paper waste, a dry density range of 1.20-1.23 $g/cm^3$, a resultant percent water absorption of 26.5 up to 36.3, and a resistance to thermal conductivity ranging from 0.266 $m^2K/W$ down to 0.251 $m^2K/W$.

Another aspect of the invention herein is directed to a method for recycling wallboard demolition waste that includes: collecting wallboard demolition waste material, wherein the wallboard demolition waste material includes substantially a core gypsum material and a wallboard front and back facing paper; comminuting the wallboard demolition waste material while substantially non-separating the wallboard front and back facing paper, wherein the comminuted wallboard demolition waste material is in a range of demolition waste material particle sizes that includes substantially gypsum material and the substantially non-separated wallboard front and back facing paper; mixing the demolition waste material particle sizes with a plurality of aggregates and binders; adding water in a distributed fine spray while mixing until an overall composite mixture is configured as a damp consistency; pressing the composite mixture at a forming pressure of up to 7.6 Mpa to provide a conformed structural unit; and curing the formed structural unit at an ambient temperature.

Highlights

Components of gypsum wallboard waste block mixtures are consistent and predictable, versus adobe blocks or Compressed Earth Blocks (CEBs) made with local soils.

Higher compressive strength versus traditional adobe block.

Hollow gypsum wallboard waste blocks embodiments also allow for simple seismic reinforcement versus traditional adobe block or solid CEBs.

Higher water resistance versus unstabilized CEBs or adobe blocks.

Lower material cost versus light-frame wood construction or concrete masonry unit (CMU) construction.

Higher r-value (i.e., a measure of how well a two-dimensional barrier resists conductive flow of heat) versus adobe, CEB, or CMU construction, allowing code-conforming wall assemblies that do not require supplemental insulation.

Higher thermal mass (i.e., a property of the mass of the components herein which enables such components to have inertia against temperature fluctuations.

Lower required skill for construction versus light-frame wood construction or CMU construction.

Easier field modification (cutting, drilling, etc.) versus CMU or other concrete construction.

As briefly stated above, the novel products herein are directed to waterproof and lighter than earth blocks, bricks or concrete-like high strength load-bearing solid shaped units. Example final structural configurations include block, spherical, cylindrical, etc., shapes. often configured for masonry applications, to include hollow core configurations for desired weight and insulation properties. Beneficially, the recycled demolition waste often contains the outer facing paper that lines both sides of the inner substantially gypsum core material as part of the simplification of the process. Such methods of formation allow for on-site production of GWWBs/DWBs and are well suited to small scale owner/builder/community building projects.

4

Figure 6:
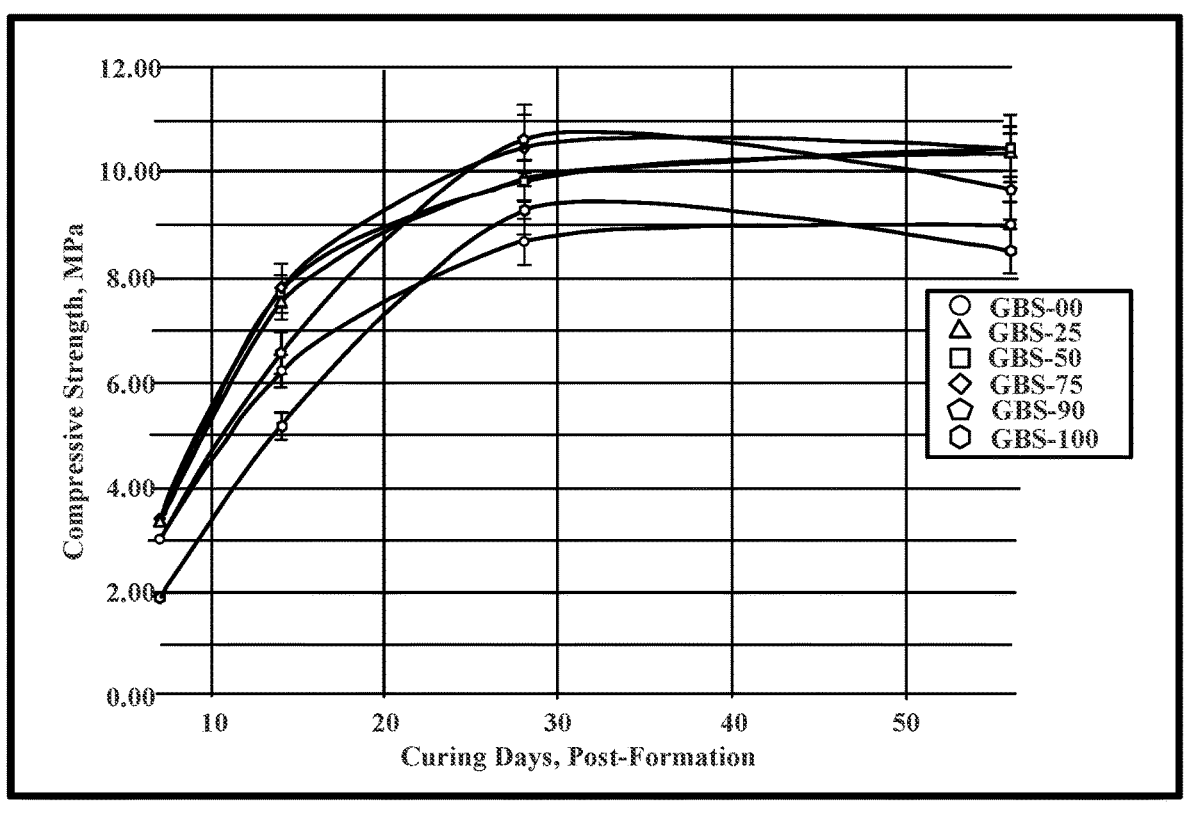

FIG. 6 shows unconfined compressive strength test results for the embodiments herein.

DETAILED DESCRIPTION OF THE INVENTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. It is to be noted that as used herein, the term "adjacent" does not require immediate adjacency. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

As used herein, masonry material(s)/units are deemed building materials/structures/configurations used in the construction of load-bearing and non-load-bearing structures that can be fortified and assembled with grout, mortar, and other suitable materials as known in the art. Example masonry units, as disclosed herein, include bricks, blocks, and tiles, and of which can have shaped configurations that include, for example, polygon shapes, non-polygonal structures (e.g., cylinders), curved shapes, ellipsoidal shapes, oval shapes units, prismatic shapes, etc. and also having such configurations.

The term "drywall", which is synonymous with "wallboard", "sheetrock", "building board", "plasterboard" or "gypsum board" as used herein and as understood by those of ordinary skill in the industry, refer to a prefabricated walling material which is of sandwich construction, often of which includes a hardened gypsum-based core or slab sandwiched between fibrous material, e.g., paper, facings or cover sheets. The primary gypsum material that can be incorporated herein so as to be used for making "drywall", "wallboard", "sheetrock", "building board", "plasterboard" or "gypsum board" and the gypsum can be either natural (i.e., "mined") gypsum or synthetic gypsum, i.e., produced from the flue gas desulfurization process at coal-burning power plants. As also used herein, the products can be referred to as drywall waste blocks (DWBs) and/or gypsum wallboard waste blocks (GWWBs).

Moreover, as used herein, gypsum is generally thought of as a soft sulfate mineral composed of calcium sulfate dehydrate. More specifically, gypsum includes sulfate minerals and a calcium sulfate hydrate (often 79% calcium sulfate and 21% water), $CaSO_4 H_2O$. The composition of a typical gypsum-based wallboard is about 75-95% gypsum, 3-9% paper, 1% fiberglass, 0.3-1% starch and the remainder, a combination of organic binders, adhesives, dispersants, and water-resistant additives. Such a composition as a recycled material can be utilized in the disclosed embodiments herein. Additional waste products incorporated into the embodiments herein can also include mechanical fasteners and minimal contamination-like materials from paint and other wall covering as part of commercial and residential construction in using such gypsum-based wallboard.

General Description

Generally, it is to be appreciated that commercially manufactured gypsum wallboard, also known as drywall, sheetrock, building board, plasterboard or gypsum board, as briefly described above, is made of a layer of gypsum plaster, mixed with glass or paper fibers and other additives, sandwiched between facing and backing layers of paper of a given thickness. It is to be noted that that the incorporated wallboard as part of the overall demolition waste can include known in the wallboards, such as, Regular Drywall (White Board), Green Board Drywall, Blueboard Drywall, Purple Drywall, Type-X drywall (made with noncombustible fibers), Soundproof Drywall, and even Paperless Drywall (i.e., has fiber-glass facing) so as to be incorporated into the products disclosed herein.

The embodiments disclosed herein utilize such a recycled waste material by using methods for reforming the recycled waste materials into composite mixture solid shaped products, often but not necessarily solid load-bearing solid shaped products and/or hollow-cored solid shaped products, and of which can have impregnated pigment colorations for aesthetic purposes.

A hollow-core configured with the embodiments herein are beneficial in that the air present in the hollow areas make good thermal insulators and thus they keep interior structures (homes) cool in the summer and warm in the winter. Such hollow structures provide for good compressive strength and the hollow space(s) (i.e., channels) make it easier to pass electrical and plumbing fixtures, as well as accommodate cast-in-place reinforced concrete lintels and bond-beams. Moreover, such hollow masonry units disclosed herein are lighter compared to solid masonry units and of which brings down the overall building costs.

The resultant composite mixtures formed under pressure into often, but not strictly limited to, masonry units, are referred to herein as gypsum wallboard waste blocks (GWWBs) and/or drywall waste blocks (DWBs), and tiles, as described herein, as well as other products (e.g., planters/pots) and shapes. Beneficially such methods of formation allow for on-site production of GWWBs/DWBs/tiles and are well suited to small scale owner/builder/community building projects, as stated above.

Surprisingly and unexpectedly because of the capable simplicity of the methodology, the gypsum wallboard waste components of the embodiments disclosed herein can often incorporate substantially "all" materials in the waste, and is insensitive to differences in gypsum wallboard from different manufacturers, allowing it to be made from a full range of gypsum wallboard waste available. As an embodiment, the wallboard waste blocks (GWWBs) and/or drywall waste blocks (DWBs) include 60 percent up to about 85 percent by total dry weight, more often 80 percent by total dry weight of the waste and often includes a binder made from industrial byproducts. As part of the simplification of the methodology, the methods and thus the finalized products from the recycled gypsum wallboard waste, incorporate the outer facing and backing paper that lines both sides of the inner gypsum core material.

In particular, depending on the process, as detailed below, such facing and backing paper can be separated (e.g., mechanically separated) and reincorporated in the final mixture but such a removal step is preferably and in a novel manner eliminated to further simplify the process and thus remove the necessity for complex and expensive machinery that are conventionally utilized to enable removing such a material as an initial step in recycling gypsum wallboard waste. Such backing paper or added paper material beneficially aids in the properties of the finalized products. It is also to be noted that while incorporation of gypsum wallboard waste from demolition would require additional processing to remove, for example. mechanical fasteners, paint, and other wall covering, beneficial aspects of the processes of the present invention also, if desired, enables use of a modicum of waste from such demolition ancillary materials in a determined manner as well.

It is also to be noted that the compositions can, if desired, also include additional cementitious binders/materials, such as, fly ash, Portland cement, various pozzolans (i.e., siliceous or siliceous and aluminous materials that in a predetermined form and in the presence of water, has cementitious properties), lime mixtures, and/or clays. The composition may also include added fine aggregates/lightweight aggregates/insulating aggregates, etc., to include, but not strictly limited to, sand, stone, gravel, slag, fly ash, glass, silica, expanded slate and clay, pumice, perlite, diatomaceous earth, shale, crushed rock, etc., as well as added natural or synthetic reinforcing fibers (e.g., straw, glass fiber, plastic fiber) without departing from the spirit and scope of the invention. It is also to be appreciated that desired aggregates are capable of being selected with a texture, size, shape, or other desired property (e.g., hardness, density) to provide the embodiments herein.

It is also to be noted that the composite mixtures can also include the joint compounds that are used in sealing panels during initial residential and commercial construction and of which therefore may be part of the recycled products disclosed herein. Such joint compounds include limestone $(CaCO_3)$, gypsum (hemihydrate) $(CaSO_4*\frac{1}{2}H_2O)$ and/or gypsum (dihydrate) $(CaSO_4*2H_2O)$.

Additionally, while potable water (i.e., freshwater that is clean and safe) is often used in the mixtures herein, other sources of freshwater water rich in minerals can also be used, (e.g., calcium) and even saltwater without departing from the scope of the invention.

As an additional embodiment, resultant products can incorporate suitable pigments, as briefly noted above, so as to aesthetically vary color of final products (e.g., tile-like products), as disclosed below. Moreover, incorporation of other additives, e.g. asphalt emulsion, can reduce water penetration and absorption of the final products.

Specific Description

Figure 1:
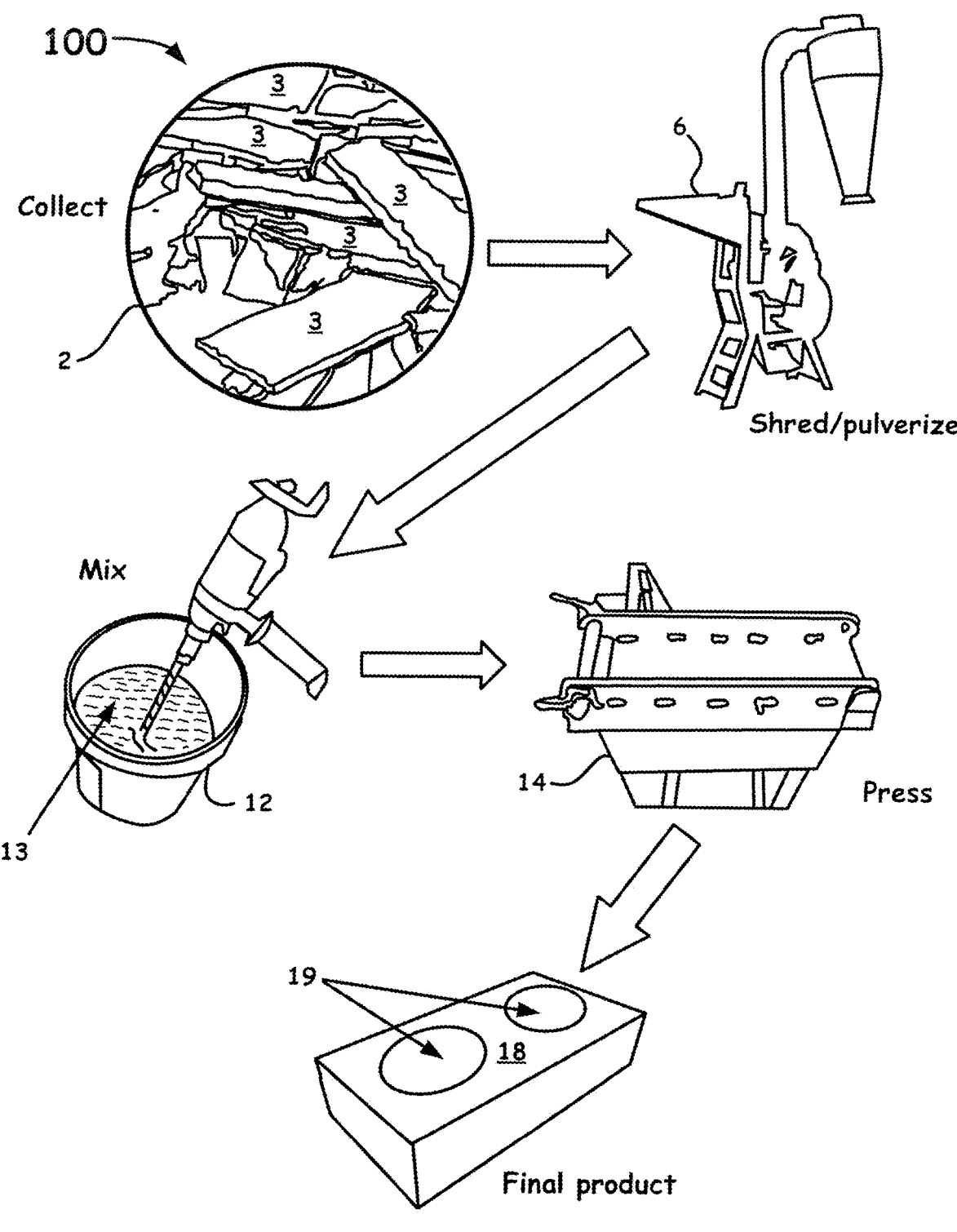
FIG. 1 shows a general depiction of the methodology and overall system of providing the GWWBs/DWBs/tile-like products, as disclosed herein.

Turning now to the figures, FIG. 1 illustrates an example general depiction of a gypsum wallboard waste recycling system, as generally referenced by the numeral 100, so as to result in beneficial composite mixture components, as disclosed herein. It is to be appreciated that while system 100 is utilized for illustrative purposes of the example novel embodiments of the present invention, it is to be understood that other alternative commercial and custom configurations having various other components can also be incorporated when using the techniques of the present application. FIG. 1 thus, in a general depiction, shows the collecting of demolition gypsum material waste 2 (i.e., wallboard 3 (not all material pieces are denoted for simplicity)) to be used for the finalized products 18. As a necessary step, the selection of the raw material includes testing for asbestos and other deleterious materials and often also includes manually removing any undesirable components, such as, but not limited to, wood and concrete.

The collected demolition gypsum material waste 2 is then directed into a desired comminution system/apparatus/industrial machinery 6 or other capable equipment, such as, for example, a shredder (e.g., an industrial shredder as shown in FIG. 1 for exemplary non-limiting purposes), a grinder, a hammer mill, rolling mill, crushing mill, a shredder, etc., as understood by those of ordinary skill in the art, so as to configure (i.e., crush, pulverize, shred, grind) the larger chunks of gypsum demolition waste (e.g., the wallboard waste) 2 into desired/suitable particle sizes (depending on one or more screen selection assemblies) of down to less than about 5 millimeters (mm), often at least less than or equal to 5 mm, with the material often including substantially all of the initial front and back facing paper of the original waste.

It is to be appreciated that with any of the available comminution 6 arrangements, as generally disclosed above, simplicity for on-site configuration of block materials is paramount. However, it is also to be noted that additional arrangements can also be employed that adds a modicum of complexity for demolition waste material 2 processing. For example, in a shredder 6 arrangement, the equipment can be configured so that a conveyer belt assembly can include a magnetic belt (not shown) oriented so as to selectively remove undesirable amounts of ferrous materials in the overall waste. Moreover, in a hammer mill comminution 6 arrangement, such a hammer mill assembly can be solely employed or be arranged in tandem with a shredder arrangement or other suitable equipment. The hammer mill alone or in combination with other suitable equipment often can employ a mechanical hammer mill so as to pulverize the demolition waste material 2 to smaller sizes and if desired reduce demolition waste material (e.g., using winnowing or screening (e.g., primary and secondary screens and/or vibrating stratifier screens) to enable removing the core gypsum material from front and backing paper material. Alternatively, the demolition waste material can be recycled back into the comminution 6 arrangement for further core material separation if desired. Beneficially, the front and backing paper materials is substantially reincorporated (along with added paper materials if needed) back into the mixture later in the process to enable the overall properties of the product 18 embodiments herein.

Following the comminution 6 system step, as shown in FIG. 1, the desired materials are directed to a mixing assembly 12 (mixing is detailed below), such as, but not limited to, a planetary mixer with paddle, a pug mill (a machine for mixing and working clay and other materials), hand mixing with shovels or mixing hoes, a ribbon mixer, planetary mixer with paddle, a pan mixer, or a rotating drum-type concrete mixer or other suitable equipment for receiving reduced in size materials and for mixing the materials with, for example, additives to enable the desired gypsum mixture 13. Thereafter, the mixture 13 is directed to a commercial or a custom-made press 14 to provide desired pressures for forming the products 18 (e.g., a block having hollow cores 19 shown in FIG. 1 as an example load-bearing insulative embodiment) disclosed herein and discussed in more detail below.

Accordingly, the composite mixtures include gypsum wallboard waste, waste paper (e.g., front and back facing paper), and binder(s) as dry ingredients, as well as a variable percentage of water depending on the application. Other aggregates, fibers, pigments, and additives may be also be included, as discussed herein. Other aggregates, fibers, pigments, and additives may be also be included, as discussed herein. With respect to wallboard in particular as to what can be inclusive in the mixtures/products from the demolition waste, as discussed above, a typical gypsum-based (note that the materials can vary according to manufacturers of wallboard) is generally about 75-95% gypsum, 3-9% paper, 1% fiberglass, 0.3-1% starch and the remainder, a combination of organic binders, adhesives, dispersants, and water-resistant additives.

It is to be reiterated that the embodiments disclosed herein utilizes substantially all materials in the waste, and is insensitive to differences in gypsum wallboard from different manufacturers, allowing it to be made from the full range of gypsum wallboard waste available. It is also to be noted that while incorporation of gypsum wallboard waste from demolition often requires additional processing to remove mechanical fasteners and minimize contamination from paint and other wall covering, suitable modification of the processes allows use of waste from overall demolition as well, as discussed herein.

Depending on a desired application and performance, it is to be appreciated that the percentage by dry weight of gypsum wallboard waste in the composite mixtures range from about 60% up to 85%. Importantly, such a maximization of gypsum wallboard waste percentage produces unexpectedly superior results and aids beneficially in environmental and economic factors. The gypsum wallboard waste component is processed into a dry powder or wet paste, as detailed under the disclosed process below.

Depending on a desired application for a particular product and performance, percentage by dry weight of paper waste (old newsprint [ONP] and other suitable waste paper may be used) in the composite mixture ranges from about 2% up to 15%. The paper waste component is processed into a dry shred or wet pulp.

As an alternate embodiment, the percentage by dry weight of cementitious binder in the composite mixture to provide desired products ranges from about 10% up to 20%. Cementitious binders, as briefly discussed above but in more detail as follows include, but are not limited to, Portland cement, synthetic and natural pozzolans, including fly ash, ground granulated blast furnace slag, silica fume, volcanic ash, and others, hydraulic lime, and the full range of mixtures of these. Because pozzolans are often less expensive than Portland cement or lime, have lowered embodied energy/ carbon footprint, and often impart desirable characteristics to the composite mixtures, the maximum effective percentage of pozzolans to Portland cement (up to 100%) is a preferred ingredient depending on the application.

For additional desired example embodiments, such as, for example, exterior and interior plasters, various clays are substituted for cementitious binders. Accordingly, in such configurations, the percentage of clay by dry weight ranges from about 20% up to 30%. Mixtures made with clay provide for products that are more plastic and less water resistant than mixtures with cementitious binders, and exhibit lower compressive strength.

It is also to be understood that Sand or other fine aggregates such as, but not limited to, ground glass and rock waste may be added in percentage by dry weight up to 20%, often greater than 20%. While fine aggregates can increase the dry and wet compressive strength of GWWBs, it is to be noted that the r-value is often reduced. This particular application is desired if the insulation value of a specific embodiment herein is less important.

Clean, potable water is incorporated into the mixtures, either as a retained component from wet-processing gypsum wallboard waste and/or paper waste, or added to dry ingredients. Percentage of water by weight of final mixture varies over a large range, depending on desired application and performance, from about 10% water in the driest soil-like mixes for compressing into GWWBs/DWBs, up to 60% or more in thin-slip mortars for binding blocks in wall assemblies. Various stuccos, plasters, and casting mixtures are formed with water percentages intermediate between these extremes. In general, the mixtures disclosed herein with a higher percentage of water requires a higher percentage by dry weight of binder(s) to compensate for a weakening effect of high-water content during curing.

Process:

Composite mixture components to provide resultant embodiments herein are often processed separately, then incorporated into various mixtures depending on a desired application and a desired performance. Gypsum wallboard waste may be wet-processed or dry-processed. Wet processing produces a fine-grained paste, with a small amount of unblended, coarser particles (less than or equal to 0.25" diameter). Mixtures made with wet-processed gypsum wallboard waste are typically more clay-like and plastic, and as an example embodiment can be conformed as plaster, shaped into adobe-style (uncompressed) blocks, or other suitable arrangements.

Dry processing produces a powder with a substantially uniform grain. Mixtures made with dry-processed gypsum wallboard waste, as disclosed herein, are often but not necessarily more soil-like and crumbly, or similar to cement/sand mortars and stuccos when more water is incorporated. Mixtures made with dry-processed gypsum wallboard waste may be compressed into blocks, and used for plaster, stucco, mortar, among other uses.

For wet processing, gypsum wallboard waste is broken up into appropriately sized pieces and soaked in clean, potable water until fully saturated. Dry weight and drained wet weight are noted so that weight of retained water (of which is to be incorporated into the final mixture) is known.

Saturated gypsum wallboard pieces are processed to a fine paste, using a machine such as a planetary mixer with paddle, a pug mill, or other suitable equipment, as similarly discussed above in the teaching of the mixing assembly 12 shown in FIG. 1.

Depending on wet processing machinery, facing and backing paper can be removed as an example method of operation from saturated gypsum wallboard pieces but is preferably not removed as a step in the process. If removed, facing and backing papers are processed separately and reincorporated into the final mixture 13, as also shown in FIG. 1.

For dry processing, gypsum wallboard waste is broken up into desired sized pieces (i.e., using comminution system/apparatus 6 (see FIG. 1 and discussion above) and processed to a fine powder of often to less than 1 millimeter (mm). Depending on dry processing machinery, facing and backing paper may also be mechanically separated from powder and removed by screening or winnowing. If removed, facing and backing papers are processed separately and reincorporated into the final mixture.

Waste paper may be wet-processed or dry-processed. Old newsprint (ONP) is preferred as a waste paper feedstock, but other papers of given textures and thicknesses may be used. Deinking of ONP is not necessary. If gypsum wallboard waste facing and backing paper has been removed, it may be processed in the same manner and simultaneously with other wastepaper.

For wet processing, paper is soaked in water until fully saturated then blended into a slurry using for example, equipment previously described, such as, a planetary mixer with paddle, rotating blades, or suitable or methods/equipment. Excess water is drained from the slurry using a screen box. Additional water may be expressed from the pulp by pressing. Dry weight and drained wet weight are noted so that weight of retained water (which often is incorporated in to the final mixture) is known.

For dry processing, paper is reduced to a fine shred using a comminution 6 arrangements (see discussion above for FIG. 1), such as a hammer mill or suitable other equipment. Depending on the machine used, this may be done simultaneously with dry processing of gypsum wallboard waste. GWWBs/DWBs may also be made with commercially-available loose cellulose insulation (a shredded waste paper product containing additives for fire, mold, and insect resistance). Use of commercial cellulose insulation is convenient and requires less labor.

A quantity of dry cementitious material (e.g., Portland cement, pozzolans, and/or lime) or powdered dry clay, or mixtures thereof, is weighed out such that desired binder percentage by dry weight of the mixture is achieved. Dry binder is thoroughly mixed with other dry component(s), or blended with wet components if only wet-processing methods have been used for gypsum wallboard waste and waste paper. Final mixing use methods similar to those used for concrete and masonry work, including, but not limited to, hand mixing with shovels or mixing hoes, ribbon mixer, planetary mixer with paddle, pan mixer, or rotating drum-type concrete mixer as similarly discussed above. Because GWWB/DWB mixtures are lighter than typical concrete mixtures, rotating drum-type cement mixers if utilized, often, but not necessarily requires modification to increase effectiveness. For clay-like mixture s, pug mills may also be used, as understood by those skilled in the art. Additional clean, potable water may be added during final mixing, depending on desired application and performance.

Quantitative measuring of mixture components and/or qualitative methods can be incorporated to assess suitability of final mixture(s), e.g., a properly made soil-like mixture for pressed GWWBs/DWBs will feel slightly damp to touch, and, when squeezed in one hand, will retain its shape without leaving wet marks on fingers or palm.

Products:

GWWBs/DWBs and tiles may be formed under pressure from suitable soil-like mixtures, using existing power/manual/commercial or custom-made machinery (e.g., a press 14 as shown in FIG. 1) for producing masonry units, as disclosed herein, such as compressed earth blocks (CEBs) with minimal adaptation. Forming pressures as provided herein have a broad range, from about 300 psi up to 2000 psi. Higher water content and higher percentage of cementitious binders enabled forming at lower pressures.

GWWBs/DWBs may be palletized and stacked for curing immediately after forming. GWWBs/DWBs are desired to be cured out of direct sunlight. Several days curing may be required before GWWBs/DWBs reach compressive strength sufficient for constructing wall assemblies. Industry standard quick curing methods, such as steam curing and kiln drying, may also be used.

Desirably, GWWBs/DWBs are formed as 12"×6"×4" units, and assembled into load-bearing double-wythe walls (two walls with a space between them) measuring 12" thick. If GWWBs are treated as equivalent to adobe masonry under International Building Codes, structures less than or equal to two stories, with wall heights less than or equal to 10 times wall thickness are allowed. When formed with hollow cores, GWWBs/DWBs are easily reinforced with steel bars and cementitious grout for seismic resistance. Hollow or solid GWWBs/DWBs may also be formed with mating convex/concave protrusions and indents, allowing for self-aligning, interlocking wall assemblies. GWWBs/DWBs of equivalent strength to concrete masonry units (CMUs) may be used in a substantially similar manner.

Other shapes, forms and applications of the GWWB composite mixtures are possible, including: blocks formed with channels (hollow cored areas) to accommodate cast-in-place reinforced concrete lintels and bond-beams as well as to make it easier to pass electrical and plumbing fixtures; half-blocks for use at corners and door and window openings; tapered blocks for arches, vaults, and domes, etc. Composite mixtures used to form GWWBs/DWBs may also be used to form roofing and flooring tiles, using similar methods and machinery.

Composite mixtures are modified, typically by varying water content and percentage of cementitious binders allowing production of mortars, interior plasters, exterior stuccos, and other interior and exterior building products. Using mortar, plaster, and stucco products with GWWBs/DWBs to construct complete wall assemblies insures maximum compatibility of assembly components, with similar mechanical and chemical properties, and produces superior results.

Wetter, clay-like mixtures may be molded into blocks similar to traditional adobe blocks. Suitably modified composite mixtures, as additional arrangements, can be cast, pressed, or extruded into other forms where the properties of the mixtures are desirable for the final product. This could include consumer goods, such as cookware and furniture.

Tiles

Tiles are formed in an appropriate press mold, with mold cavity volume approximately twice the desired volume of finished tile, and with cross section matching desired tile size and shape (square, rectangular, polygonal, etc). Mold material and wall thickness should be sufficient to resist forming pressures of 250-1500 psi without distortion or failure. Mold is equipped with a close-fitting piston and closing mechanism to allow pressing of tile mixture after mold is charged. Forming pressure is typically supplied by hydraulic cylinder connected to piston with appropriate linkage, although other methods, such as a manually-operated lever or screw, may be used.

Tile mixtures are prepared from shredded gypsum drywall waste, combined with cementitious binders, and pigment for coloring. Mixtures are similar to those used for Drywall Waste Blocks. Use of finely powdered drywall waste, with minimum paper content is used to produce tiles with finer surface texture, more uniform coloring, and more clearly defined pattern. Binder component may include Portland cement, ground granulated blast furnace slag, fly ash, wood ash, combinations of these, and other pozzolans/geopolymers. Compressive strength of tiles may be manipulated by incorporation of other aggregates, including sand, ground glass, and others. Water absorption of cured tiles may be manipulated by incorporation of hydrophobic admixtures in the tile mixture pre-formation, or by soaking or coating tiles with various sealants and penetrants post-formation. Appropriate admixtures, sealants, and penetrants include: asphalt emulsion; water glass (sodium silicate); so-called metal soaps (e.g., calcium stearate); siloxanes; waxes; drying oils; etc.

Method #1

Water requirement for tile mixtures using this method is minimized, such that ready-to-press mixtures have a consistency similar to barely-damp sand. Ratio of water to dry ingredients varies, depending on admixtures, aggregates, binders, and pigments.

Piston is lowered in the mold, forming the floor of a mold cavity of desired volume. A form constructed of thin metal, plastic, or other suitable material is inserted into the mold cavity, dividing the cavity into different sections corresponding to the different colored areas of the pattern of the finished tile. These areas are charged with different colors of tile mixture, and the form is carefully removed. The lid is secured over the top of the mold and piston is raised, forming the tile through compression. The lid is removed and the piston is raised further, ejecting the formed tile. The tile is removed and the piston is lowered, ready for the next cycle. This method can use manual, semi-automatic, or fully automatic machinery.

Pressed 'green' tiles may be cured using several methods, including: wrapping with polyethylene sheeting or other membrane and damp curing at ambient temperature and pressure; low pressure steam curing; and autoclave curing at elevated temperature and pressure. Regardless of curing method, tiles should be allowed to dry thoroughly before installation.

Figure 2A:
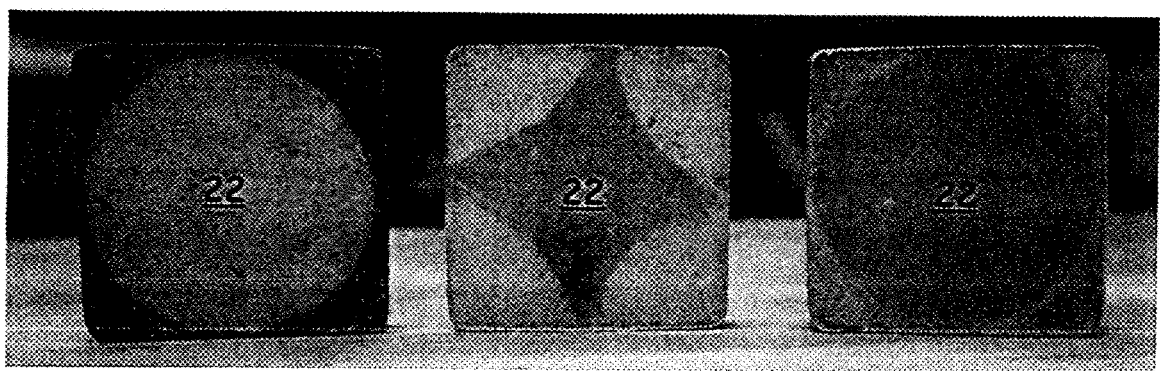
FIG. 2A shows an image of desired patterns configured with exemplary tile units, as disclosed herein.

When properly made, tiles using this method have a desired pattern 22 that runs through the entire thickness of the tile, rather than just the top surface, as illustrated in FIG. 2A. This conceals damage to tiles during service life, allows tiles to be resurfaced to extend service life, and permits terrazzo-like installation methods to achieve flush surfaces with minimized labor.

Method #2

Tiles made with this method have a pigmented 'color layer' which while thick enough to allow for wear, is backed up with a thicker unpigmented 'body layer' that makes up the majority of the tile thickness.

The color layer is formed in a manner similar to Method #1 above, except the pigmented mixtures are mixed with enough water to make a pourable fluid or slip, similar in consistency to heavy cream. Once pigmented mixtures are poured into the different sections of the form, the form is removed, and dry unpigmented tile mix is sifted over the top, using a coarse sieve or similar. The sieved layer is followed by a layer of unpigmented barely-damp mix, as described under Method #1 above.

The present invention will be more fully understood by reference to the following additional specifically detailed examples, which are intended to be illustrative of the present invention, but not limiting thereof.

EXAMPLES

Methods

A. Materials

Figure 2B:
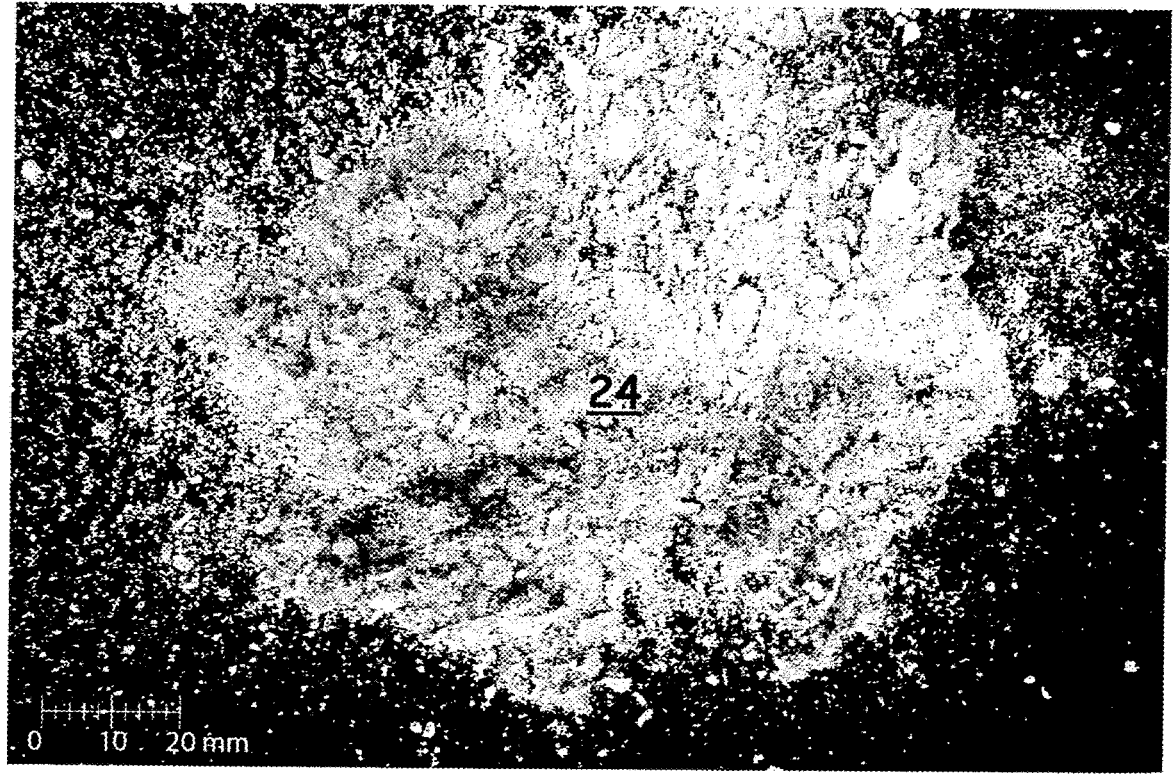
FIG. 2B shows an image of a typical Drywall Waste Block shred mixture.

Gypsum drywall waste (GW) of ⅜", ½", and ⅝" nominal thickness (approximately 9.5 mm, 13 mm, and 16 mm) was sourced from local building construction and demolition sites. Waste included a variety of drywall types. Demolition waste tested negative for presence of asbestos. Waste was processed using a hammer mill equipped with 5 mm screen, as shown by the image of drywall waste shred 24 in FIG. 2B. Old newspaper (ONP) was sourced from Washington State University Recycling Services, also processed using a hammer mill equipped with 5 mm screen. Portland cement (PC) (ASTM C150 Type I-II) was purchased from local dealer. Ground granulated blast furnace slag (GGBS) (ASTM C989 Grade 100) was supplied by LaFarge North America, manufactured in Seattle, WA from slag sourced from JFE Mineral Company, Kurashiki City, Japan. Asphalt emulsion (AE) was purchased from local dealer, sold as driveway and foundation sealer distributed by the Henry Company.

B. Mixing and Forming

Figure 3A:
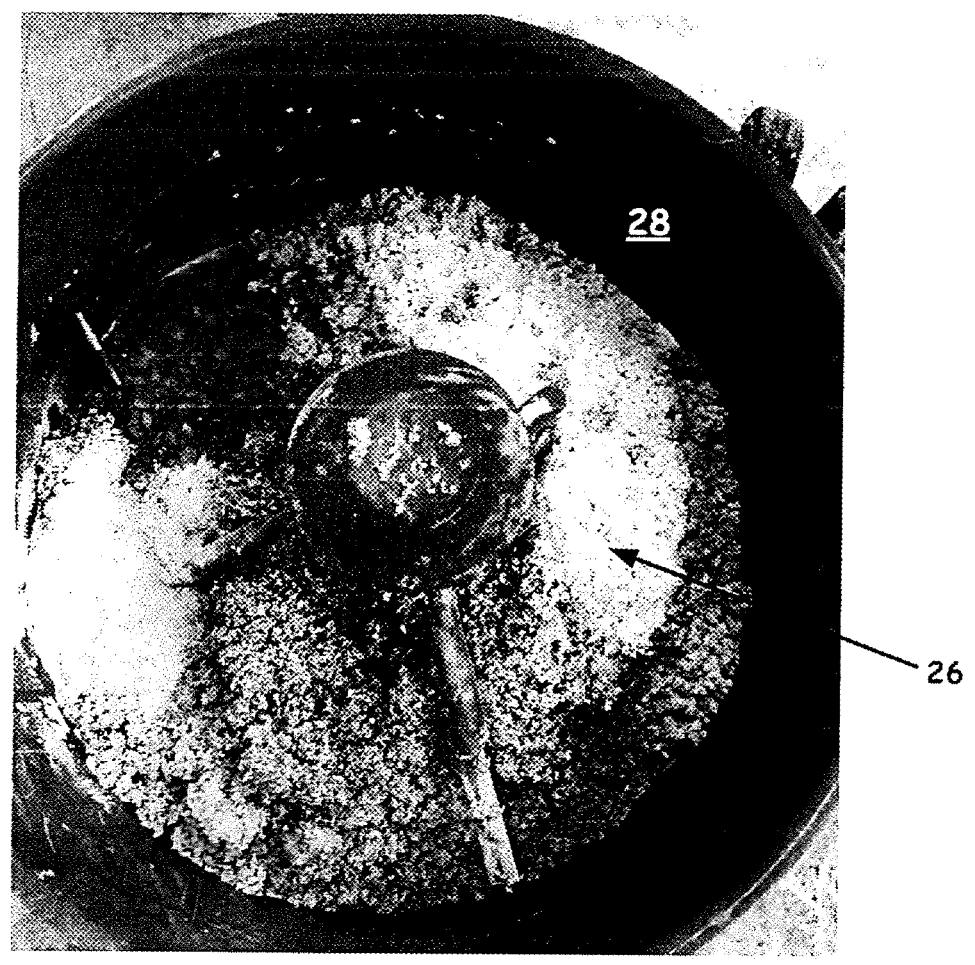
FIG. 3A shows an image of an exemplary mixture in a 120 L capacity pan mixer.
Figure 3B:
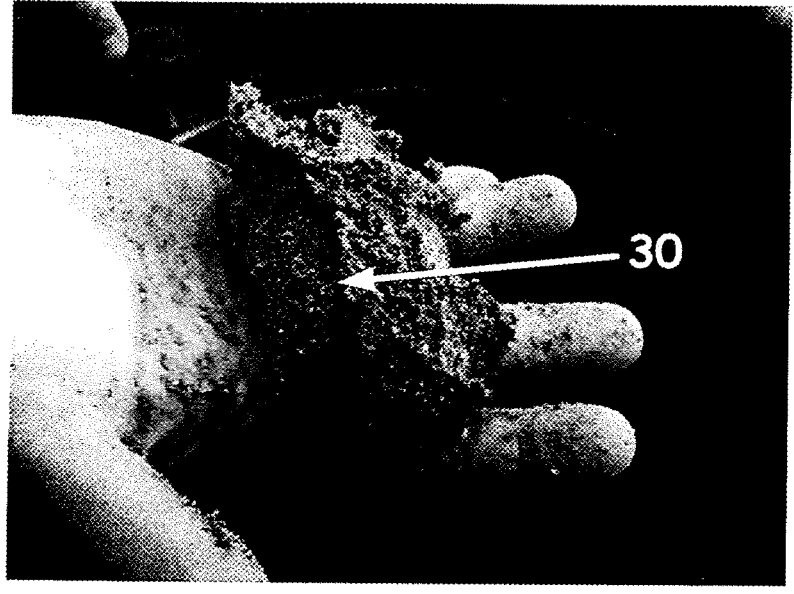
FIG. 3B shows a typical wet mix, as disclosed herein.

Aggregates and binders were dry-mixed, as generally shown by the resultant image of the dried ingredients 26 in FIG. 3A, three minutes in a 120 L capacity pan mixer 28, followed by addition of water in distributed fine spray while mixing, until mix achieved consistency of barely-damp soil, holding shape when squeezed in the hand, without releasing moisture, as illustrated in the image of FIG. 3B denoting a typical wet mix. Mixing continued 10 minutes after water addition.

Figure 4:
FIG. 4 shows an image of example GWWB/DWB blocks formed by a custom-made press.
Figure 5:
FIG. 5 shows the example formed GWWB/DWB block of FIG. 4 so as to best exemplify the embodiment configured with channels.

First-generation (GWWBs/DWB) blocks 34, as shown in FIG. 4 resulting in a (GWWBs/DWB) block as shown in the image in FIG. 5, measuring in this example, 305 mm×152 mm×76 mm (12"×6"×3"), with two hollow cores/channels 40 each 89 mm dia. (3.5"), were formed on a custom-made press 36 at 2.3 MPa (340 psi) pressure, with approximate dry density of 1.0 g/cm³. Recipe was adjusted until cured blocks exhibited uniform compaction, with no evidence of dissolution when soaked in water. A second-generation press was designed and fabricated to produce block prototypes at forming pressure up to 7.6 MPa (1100 psi), with block dry density of approximately 1.2 g/cm³.

To facilitate testing, cylindrical test specimens with diameter 79 mm±0.5 mm (~3.1 in) and height 89 mm±2 mm (~3.5 in) were fabricated using a mold insert. Forming pressure was 7.5 MPa (1090 psi). Specimens were placed in polyethylene bags for initial curing at ambient lab temperature (20° C.±5° C.) for seven days, and then removed from bags for curing in air. Dry density of specimens measured at 42-day post-formation ranged from 1.20-1.23 g/cm³.

C. Test Specimen Mix Proportions

Test cylinders of mixes with variable proportions of blast furnace slag were evaluated for unconfined compressive strength, as shown in Table 1 as follows:

TABLE 1

| MIX ID | GGBS Percent of Binder | GGBS g/100 g | PC g/100 g | GW g/100 g | ONP g/100 g | Water g/100 g |
|---|---|---|---|---|---|---|
| GBS-00 | 0 | 0 | 15 | 60 | 2 | 23 |
| GBS-25 | 25 | 4 | 11 | 59 | 2 | 24 |
| GBS-50 | 50 | 8 | 8 | 60 | 2 | 23 |
| GBS-75 | 75 | 11 | 4 | 59 | 2 | 23 |
| GBS-90 | 90 | 14 | 2 | 59 | 2 | 24 |
| GBS-100 | 100 | 15 | 0 | 58 | 2 | 25 |

The ratio of GW and ONP with respect to total dry mass was held constant. Ratio of aggregate to binder was held constant. Mixing water was added until phenomenology specified above was achieved.

Test cylinders of mixes with variable proportions of asphalt emulsion were evaluated for water absorption as illustrated in Table 2 as follows:

TABLE 2

| MIX ID | Admixture percent of total dry weight | Drywall Waste (DW) g/100 g | Portland Cement (PC) g/100 g | Asphalt Emulsion (AE) g/100 g | Water g/100 g |
|---|---|---|---|---|---|
| AE-00 | 0 | 64 | 16 | 0 | 20 |
| AE-05 | 4 | 60 | 16 | 5 | 19 |
| AE-10 | 9 | 56 | 16 | 10 | 17 |
| AE-20 | 19 | 49 | 16 | 21 | 14 |

PC binder, GW aggregate, and total water content (including water content of asphalt emulsion) were held constant.

D. Engineering Properties

Unconfined compressive strength of specimens was tested using procedures adapted from ASTM C39/C39M-18, on a modified H-frame hydraulic press equipped with Transducer Techniques LB-20K load cell, 89 kN (20,000 lb-f) capacity and Omega DP41-S meter. Specimens were tested at 7, 14, 28, and 56 days post-formation.

Water absorption was tested using procedures adapted from ASTM C140/C140M-18. Specimens were air-dried ~28 days at ambient lab temperature (20° C.±5° C.). Half the specimens were dried further in a ventilated oven at 99° C.±2° C. (211° F.) for 24 hours before testing. All specimens were then immersed in water for 24 hours, removed and weighed, and then dried again in a ventilated oven as above, for minimum 24 hours before reweighing. Percentage of water absorbed during immersion was calculated according to the formula in ASTM C140/C140M-18.

A 305 mm×305 mm×54 mm specimen of the GBS-00 mix, pressed at approximately 2.8 Mpa (400 psi), was tested for resistance to thermal conductivity using a guarded hot-plate testing apparatus by the Composite Materials and Engineering Center at Washington State University.

Accordingly, GWWBs/DWBs example embodiments are similar to earth and concrete masonry blocks in appearance, form-factor, and ease of manufacture. Density of GWWBs/DWBs is significantly lower than ASTM C90-16a specifications for lightweight CMU, suggesting superior performance with regard to transportation and labor costs.

GWWBs/DWBs test specimens with a mixture of GGBS and PC showed higher compressive strength than specimens containing GGBS or PC alone. Strength curves flattened or fell between 28 and 56 days, as shown in FIG. 6. Compressive strengths for all mixtures are as shown in Table 3 that follows. Results indicate that compressive strength for all mixtures was below 13.8 MPa (2000 psi) specified for CMU in ASTM C90-16a, but higher than specifications for lightweight, insulative concrete masonry blocks, such as, autoclaved aerated concrete (ASTM C1386-07), and higher than code-required strengths for earth-masonry systems (ICC 2012).

TABLE 3

| | $H_2O$ Percent of | GGBS binder | Experimental values Average Compressive Strength, MPa | | | |
|---|---|---|---|---|---|---|
| MIX ID | Binder | percent | 7 days | 14 days | 28 days | 56 days |
| GBS-00 | 23 | 0 | 3.05 | 6.24 | 8.70 | 9.01 |
| GBS-25 | 24 | 25 | 3.32 | 7.52 | 9.88 | 10.4 |
| GBS-50 | 23 | 50 | 3.40 | 7.76 | 9.85 | 10.5 |
| GBS-75 | 23 | 75 | 3.43 | 7.82 | 10.5 | 10.5 |
| GBS-90 | 24 | 90 | 3.05 | 6.59 | 10.7 | 9.71 |
| GBS-100 | 25 | 100 | 5.21 | 5.21 | 9.30 | 8.53 |

GWWBs/DWBs specimens tested for water absorption exceeded 20% maximum specified in ASTM C90-16a for CMU, as shown as follows in Table 4:

TABLE 4

| | | Experimental values | | | |
|---|---|---|---|---|---|
| MIX ID | Admixture (Percent) | OD Initial Weight (g) | Saturated Weight (g) | OD Final Weight (g) | Absorption (Percent) |
| AE-00 | 0 | 494 | 660 | 484 | 36.3 |
| AE-05 | 4 | 484 | 700 | 481 | 45.5 |
| AE-10 | 8 | 501 | 690 | 496 | 39.0 |
| AE-20 | 19 | 494 | 594 | 470 | 26.5 |

However, specimen's oven-dried before water immersion showed decrease in dry weight after the second oven drying. Drying temperatures may have caused partial calcination of the gypsum, affecting results.

Resistance to thermal conductivity for the specimen tested ranged from 0.266 $m^2$K/W (R 1.51), to 0.251 $m^2$K/W (R 1.43), 54 mm thickness, for six pairs of temperature differentials, from 25° C. to –25° C. This exceeds published value for lightweight CMU single wythe wall (empty cores) of 0.07 $m^2$K/W (R 0.32), at 203 mm (8") nominal thickness.

Qualitative assessment of DWB prototypes supports continued investigation as a replacement for CMU. DWB have potential to divert more gypsum wallboard waste from landfills and require less Portland cement than CMU, resulting in lower embodied energy and smaller carbon footprint.

We claim:

1. A method for forming a structural unit from a wallboard material, comprising:

comminuting a wallboard material comprised of a gypsum material having a wallboard front facing paper and a wallboard back facing paper respectively positioned on a front and a back of the gypsum material, wherein the comminuting is performed such that at least some of the wallboard front facing paper and the wallboard back facing paper are not separated from the gypsum material, and wherein the comminuting produces a comminuted material having particles that include the gypsum material with at least some non-separated wallboard front facing paper and/or non-separated wallboard back facing paper;

mixing the particles that include the gypsum material with at least some of the non-separated wallboard front facing paper and/or the non-separated wallboard back facing paper with water and one or more aggregates and binders to form a composite mixture configured with a damp consistency, wherein damp consistency comprises a water percentage such that a sample, when gripped prior to curing, holds shape; and forming the composite mixture into the structural unit.

2. The method of claim 1, wherein the comminuting step comprises separating a quantity of the wallboard front facing paper and the wallboard back facing paper from the gypsum material, and wherein the mixing step comprises reincorporating the quantity of the wallboard front facing paper and the wallboard back facing paper with the particles that include the gypsum material with at least some of the non-separated wallboard front facing paper and/or the non-separated wallboard back facing paper during the mixing step.

3. The method of claim 1, further comprising adding dry weight of paper waste in the composite mixture in a range from about 2% up to 15%.

4. The method of claim 3, wherein the adding of dry weight of paper waste comprises at least one of adding a quantity of the wallboard front facing paper and the wallboard back facing paper that is separated from the gypsum material during comminuting to the particles that include the gypsum material with at least some of the non-separated wallboard front facing paper and/or the non-separated wallboard back facing paper, adding a plurality of particles of a newspaper print paper to the particles that include the gypsum material with at least some of the non-separated wallboard front facing paper and/or the non-separated wallboard back facing paper, and adding a plurality of particles of paper that is not particles of a newspaper print paper to the particles that include the gypsum material with at least some of the non-separated wallboard front facing paper and/or the non-separated wallboard back facing paper.

5. The method of claim 1, wherein the one or more aggregates and binders are selected from the group consisting of sand, stone, gravel, slag, fly ash, glass, silica, expanded slate, clay, pumice, perlite, diatomaceous earth, shale, crushed rock, straw, glass fiber, and plastic fiber.

6. The method of claim 1, wherein the one or more aggregates and binders comprise a dry weight of cementitious binders from about 10% up to 20%.

7. The method of claim 1, wherein the wallboard material is formed from demolition waste which comprises one or more of, paint, and wall covering material.

8. The method of claim 1, further comprising adding a pigmented color layer in the formed structural unit.

9. The method of claim 1, wherein the wallboard material is drywall that has been collected for recycling as the formed structural unit.

10. The method of claim 1, wherein the mixing step is performed while spraying the water on the particles that include the gypsum material with at least some non-separated wallboard front facing paper and/or non-separated wallboard back facing paper.

11. The method of claim 1, wherein the formed structural unit has a thermal conductivity ranging from 0.266 $m^2$K/W down to 0.251 $m^2$K/W.

12. The method of claim 1, wherein the composite mixture formed by the mixing step has a percent water absorption of 26.5% up to 36.3%.

13. The method of claim 1, further comprising adding paper to the wallboard material prior to or during the mixing step.

14. The method of claim 13, wherein the added paper is waste paper.

15. The method of claim 1, wherein the wallboard material is formed from wallboard demolition waste.

16. The method of claim 15, further comprising adding waste paper to the wallboard demolition waste prior to or during the mixing step, and wherein the composite mixture is 60% up to about 85% by total dry weight of the wallboard demolition waste, and 2% up to about 15% dry weight of waste paper.

17. The method of claim 1, wherein the forming step comprises
  pressing the composite mixture at a forming pressure to provide a conformed structural unit; and
  curing the formed structural unit at an ambient temperature.

* * * * *